United States Patent
Lee et al.

(10) Patent No.: US 11,556,276 B2
(45) Date of Patent: Jan. 17, 2023

(54) MEMORY SYSTEM AND OPERATING METHOD THEREOF

(71) Applicant: SK hynix inc., Gyeonggi-do (KR)

(72) Inventors: Joo-Young Lee, Seoul (KR); Hoe-Seung Jung, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 379 days.

(21) Appl. No.: 16/802,771

(22) Filed: Feb. 27, 2020

(65) Prior Publication Data
US 2021/0004180 A1 Jan. 7, 2021

(30) Foreign Application Priority Data
Jul. 5, 2019 (KR) .......................... 10-2019-0081341

(51) Int. Cl.
*G06F 11/20* (2006.01)
*G06F 3/06* (2006.01)
*G06F 12/10* (2016.01)

(52) U.S. Cl.
CPC ............ *G06F 3/0659* (2013.01); *G06F 3/061* (2013.01); *G06F 11/2094* (2013.01); *G06F 12/10* (2013.01); *G06F 2201/82* (2013.01)

(58) Field of Classification Search
CPC .... G06F 11/20; G06F 11/2094; G06F 3/0659; G06F 3/061
See application file for complete search history.

(56) References Cited

U.S. PATENT DOCUMENTS

| | | | |
|---|---|---|---|
| 7,177,989 B1* | 2/2007 | McGinnis | G06F 11/141 |
| | | | 711/151 |
| 10,019,199 B2* | 7/2018 | Park | G06F 3/065 |
| 10,282,250 B1* | 5/2019 | Banerjee | G06F 3/0659 |
| 10,579,264 B2* | 3/2020 | Lee | G06F 3/0604 |
| 2017/0192719 A1* | 7/2017 | Park | G06F 3/0679 |
| 2018/0039447 A1* | 2/2018 | Lee | G06F 11/1064 |
| 2018/0217754 A1* | 8/2018 | Lee | G06F 3/0685 |
| 2019/0114239 A1* | 4/2019 | Seo | G06F 3/0679 |
| 2020/0167232 A1* | 5/2020 | Lee | G06F 11/1016 |
| 2020/0327065 A1* | 10/2020 | Jung | G06F 9/485 |
| 2020/0379681 A1* | 12/2020 | Jung | G06F 3/0679 |

FOREIGN PATENT DOCUMENTS

KR 10-2018-0080589 7/2018
KR 10-2020-0137244 A 12/2020

\* cited by examiner

*Primary Examiner* — Kamini B Patel
(74) *Attorney, Agent, or Firm* — IP & T Group LLP

(57) ABSTRACT

A memory system includes: a memory device; a first queue suitable for queuing commands received from a host; a second queue suitable for enqueuing the commands from the first queue and dequeuing the commands to the memory device according to the FIFO scheme; and a processor suitable for: delaying enqueuing a read command into the second queue until the program operation is successfully performed when a logical address of a write command, in response to which a program operation is being performed, is the same as a logical address corresponding to the read command enqueued in the first queue; and determining whether or not to enqueue a subsequent read command, which is enqueued in the first queue after the read command, into the second queue.

20 Claims, 8 Drawing Sheets

MEMORY SYSTEM AND OPERATING METHOD THEREOF

CROSS-REFERENCE TO RELATED APPLICATION

The present application claims priority of Korean Patent Application No. 10-2019-0081341, filed on Jul. 5, 2019, which is incorporated herein by reference in its entirety.

BACKGROUND

1. Field

Various embodiments of the present invention relate to a memory system, and more particularly, to a memory system for improving the performance of a read operation, and a method for operating the memory system.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Embodiments of the present invention are directed to a memory system that may delay an operation of enqueuing a read command having the same logical address as a logical address at which a program operation is being performed into a command queue.

In accordance with an embodiment of the present invention, a memory system, including: a memory device; a first queue suitable for queuing commands received from a host; a second queue suitable for enqueuing the commands from the first queue and dequeuing the commands to the memory device according to the FIFO scheme; and a processor suitable for: delaying enqueuing a read command into the second queue until the program operation is successfully performed when a logical address of a write command, in response to which a program operation is being performed, is the same as a logical address corresponding to the read command enqueued in the first queue; and determining whether or not to enqueue a subsequent read command, which is enqueued in the first queue after the read command, into the second queue.

In accordance with another embodiment of the present invention, a method for operating a memory system includes: queuing commands received from a host into a first queue; enqueuing the commands from the first queue into a second queue and dequeuing the commands to a memory device according to the FIFO scheme; when a logical address corresponding to a write command, in response to which a program operation is being performed, is the same as a logical address of a read command enqueued in the first queue, delaying enqueuing the read command into the second queue until the program operation is successfully performed; and determining whether or not to enqueue a subsequent read command which is enqueued in the first queue behind the read command into the second queue, when the enqueuing of the read command into the second queue is delayed.

In accordance with another embodiment of the present invention, a memory system includes: a memory device including storage regions represented by respective logical addresses; a first queue configured to sequentially enqueue first and second read commands received from a host; a second queue operable according to a first-in-first-out (FIFO) scheme and configured to sequentially enqueue commands dequeued from the first queue; and a controller configured to control the memory device to perform operations by providing the commands from the second queue to the memory device, wherein the controller is further configured to: hold dequeuing the first read command from the first queue and enqueuing the first read command into the second queue, while the memory device performs a program operation in response to a program command from the second queue, wherein logical addresses corresponding to the program command and the first read command are the same; dequeue, during the hold operation, the second read command from the first queue and enqueue the second read command into the second queue; and release the hold when the program operation is successful.

DETAILED DESCRIPTION

Figure 1:
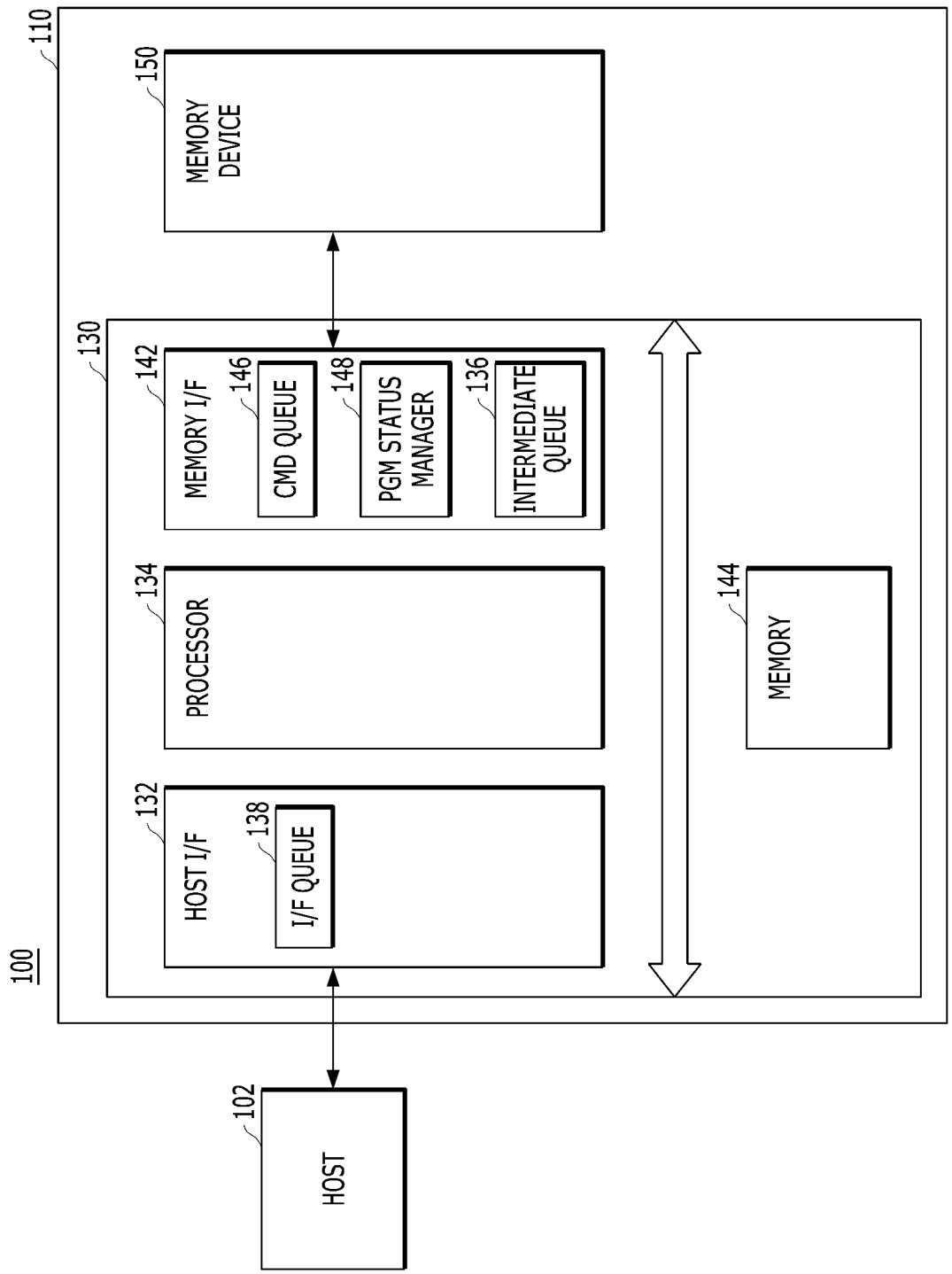
FIG. 1 is a block diagram illustrating a data processing system including a memory system in accordance with an embodiment of the present invention.

Various embodiments of the present invention are described below in more detail with reference to the accompanying drawings. The present invention may, however, be embodied in different forms and thus is not limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to "an embodiment" are not necessarily to the same embodiment(s).

It will be understood that, although the terms "first" and/or "second" may be used herein to identify various elements, these elements are not limited by these terms. These terms are only used to distinguish one element from another element that otherwise have the same or similar names. For example, a first element in one instance could be termed a second element in another instance with indicating any change in the element itself.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The disclosed embodiments are merely for the purpose of understanding the present invention, not to limit it. As those skilled in the art to which the present disclosure pertains will understand in light of the present disclosure, various modifications within the scope of the invention may be made to any of the disclosed embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed in an ideal or excessively formal way.

Various embodiments of the present invention are described in detail below with reference to the attached drawings.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include any of various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks, each of which may include a plurality of pages, each of which may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, a memory interface 142, and a memory 144, all operatively coupled or engaged via an internal bus. The host interface 132 may include an interface queue 136, as described below with reference to FIG. 8. The memory interface 142 may include a command queue 146 and a program status manager 148.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via a firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The interface queue 136 may queue command provided from the host 102. A logical address of the enqueued command is mapped to a physical address. The command is then dequeued from the interface queue 136 according to a first-in-first-out (FIFO) scheme. The dequeued command is enqueued into the command queue 146. The enqueued command is then dequeued from the command queue 146 and provided to the memory device 150. A command operation is performed by the memory device 150 based on the provided command.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In another embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store data to perform data write and read operations between the host 102 and the memory device 150 and other data for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor and/or a central processing unit (CPU).

For example, the controller 130 may perform an operation requested by the host 102 in the memory device 150 through the processor 134. Also, the controller 130 may perform a background operation on the memory device 150 through the processor 134. The background operation performed on the memory device 150 may include an operation of copying data stored in some memory blocks among the memory blocks of the memory device 150 storing the copied data in other memory blocks, e.g., a garbage collection (GC) operation, an operation of swapping data between memory blocks, e.g., a wear-leveling (WL) operation, an operation of storing the map data stored in the controller 130 in the memory blocks, e.g., a map flush operation, or an operation of managing bad blocks of the memory device 150, e.g., a bad block management operation of detecting and processing bad blocks among the memory blocks in the memory device 150.

Figure 2:
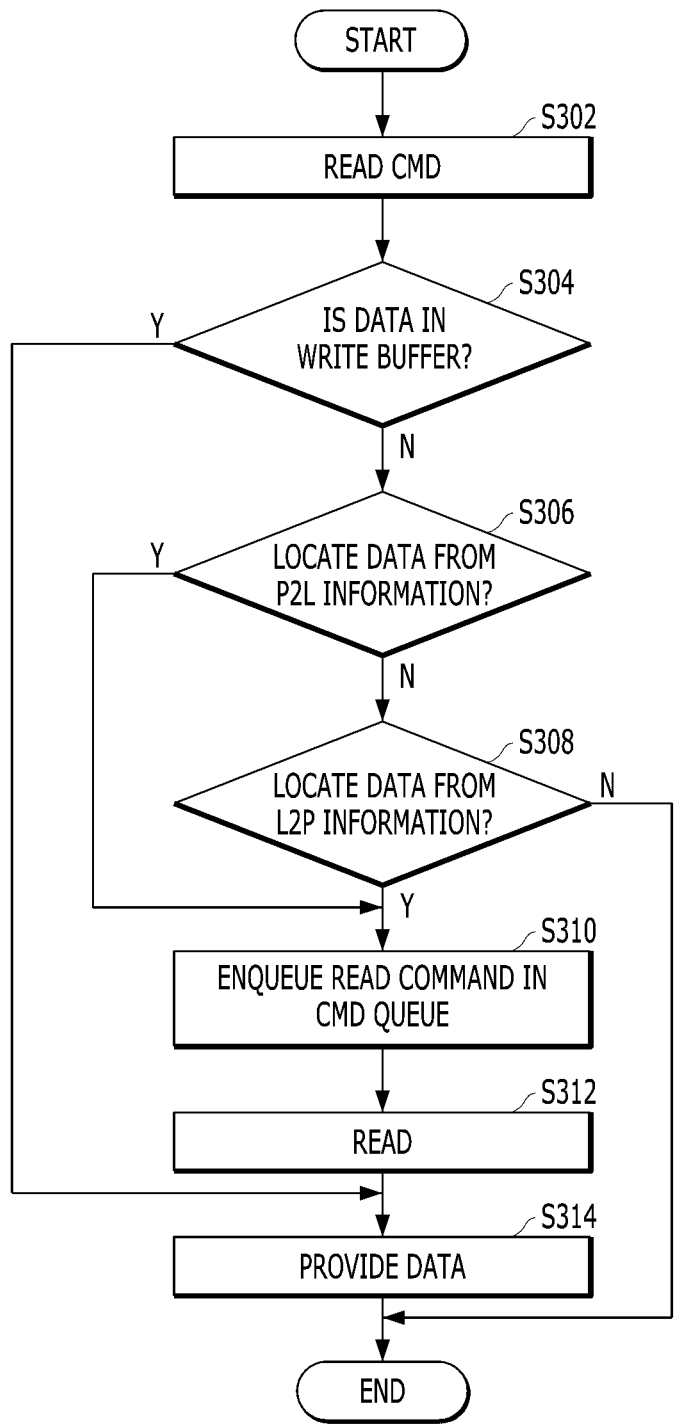
FIG. 2 is a flowchart describing a read operation according to prior art.

FIG. 2 is a flowchart describing a read operation according to prior art.

In step S302, a controller enqueues a read command provided from a host in an interface queue. The host provides the controller with the read command and a corresponding logical address.

In step S304, the controller checks whether read data for the read command is buffered in a write buffer based on the logical address. The write buffer temporarily stores the data provided from the host and may be a cache for a memory block of a memory device.

In step S306, when the read data is not buffered in the write buffer ('N' at step S304), the controller checks whether the read data can be located from physical to logical (P2L) information. The controller retrieves a physical address of the read data from the P2L information. The P2L information is map information for an open block. The controller controls the memory device to erase a memory block and allocate the erased memory block as the open block to control the memory device to program the data into the open block. Accordingly, the P2L information includes map information on the data for which a program operation is being performed. When the controller locates the read data from the P2L information, i.e., when the controller retrieves the physical address of the read data from the P2L information, the controller updates the read command queued in the interface queue to include the retrieved physical address.

In step S308, when the controller cannot locate the read data from the P2L information ('N' at step S306), the controller locates the read data from the logical to physical (L2P) information. The L2P information may be map information which is updated at least once. The number of logical addresses included in the P2L information may be larger than the number of logical addresses for the data stored in the write buffer and may be smaller than the number of physical addresses stored in the L2P information. The controller sequentially locates the data for the read command based on the L2P information. When the data for the read command are not located from the L2P information ('N' at step S308), the data requested by the host may not exist in the memory system. In that case, the controller provides the host with a trim signal to indicate that the requested data does not exist in the memory system.

In step S310, when the controller can locate the read data from the P2L information or the L2P information ('Y' at step S306 or 'Y' at step S308), the controller dequeues the read command from the interface queue and enqueues the read command in the command queue CMD QUEUE according to FIFO scheme. The controller then controls the memory device to perform a read operation according to the read command by dequeuing the read command from the command queue CMD QUEUE according to the FIFO scheme and providing the memory device with the dequeued read command.

In step S312, the memory device performs a read operation in response to the read command. The memory device reads the data stored in the physical address retrieved from the P2L information or the L2P information and provides the controller with the read data. The controller performs an error correction operation on the provided data.

In step S314, the controller provides the host with the data that are read in step S312 or the data retrieved from the write buffer ('Y' at step S304).

Figure 3:
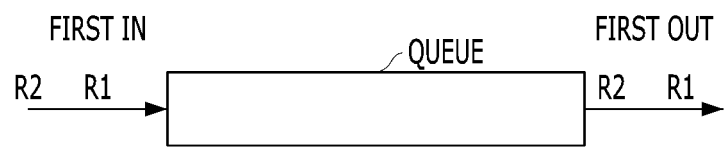
FIG. 3 is a diagram illustrating a method of managing a queue based on a first-in first-out (FIFO) scheme.

FIG. 3 is a diagram illustrating a method of managing a queue based on the FIFO scheme.

The FIFO scheme may mean a method of dequeuing data from a queue in the order that the data are enqueued in the queue. Referring to FIG. 3, when a first read command R1 is enqueued first in the queue (QUEUE) and then a second read command R2 is enqueued in the queue, the read command R1 is dequeued first from the queue and then the second read command R2 may be dequeued from the queue. The FIFO scheme is a general method of operating a queue, and the interface queue and the command queue may also be operated according to the FIFO scheme as well.

Since the P2L information may include map information corresponding to the data being programmed, when the locations where the data for the read command are stored are retrieved from the P2L information and the read command is queued in the command queue, a program operation may be performed on the physical address mapped to the logical address of the read command.

In this case, the controller may not dequeue the read command from the command queue.

When the program operation fails, the controller may control the memory device to perform an error handling operation of programming the program-failed data into another memory block. Therefore, a physical address originally allocated to the program-failed data may be changed to another physical address that is newly allocated to the program-failed data and represents the another memory block because of the error handling operation. Accordingly, when the controller dequeues the read command queued in the command queue and then the error handling operation is successfully performed, the controller may update the physical address of the read command based on the changed physical address and then queue it again in the command queue.

However, dequeuing the read command from the command queue, updating the dequeued read command and re-enqueuing the updated read command may increase the complexity of the error handling. Therefore, there may be a problem in that the performance of the memory system is deteriorated.

Further, there may occur a situation in which a read command should stay queued in the command queue until a related program operation succeeds. According to prior art, since the command queue operates under the FIFO scheme, a subsequent read command enqueued in the command queue after the read command should also stay queued in the command queue while the read command stays queued. Therefore, according to prior art, when a program operation is being performed for a physical address mapped to a logical address corresponding to a read command queued in the FIFO command queue, a subsequent read command enqueued in the command queue after the read command should also stay queued in the command queue until the program operation succeeds even though the subsequent read command has nothing to do with the program operation.

According to an embodiment of the present invention, the controller 130 may determine whether or not a program operation for a physical address mapped to a logical address corresponding to a read command is being performed before enqueuing the read command in the command queue 146. The controller 130 may delay enqueuing the read command in the command queue 146 and make the read command remain in the interface queue 136 when the program operation for the physical address mapped to the logical address corresponding to the read command is being performed. When the program operation fails and thus the physical address originally allocated for the program-failed data is changed to a newly allocated physical address due to an error handling operation, the read command that remains queued in the interface queue 136 may be updated to map the logical address corresponding to the read command to the newly allocated physical address. After the error handling operation succeeds and the read command is updated and thus linked to the newly allocated physical address, the read command may be enqueued in the command queue 146. According to an embodiment of the present invention, an error handling operation to change the physical address is performed, and then only the read command corresponding to the logical address mapped to the correct physical address is enqueued in the FIFO command queue 146, and the read command is not dequeued from the command queue 146 to update the physical address, which reduces the complexity of the error handling operation.

Further, the controller 130 may change the dequeue order of the interface queue 136 while the read command remains queued in the interface queue 136 because of the program operation being performed for the physical address mapped to the logical address corresponding to the read command. While the read command stays queued in this situation, the controller 130 may dequeue a subsequent read command, enqueued after the read command and positioned ahead of the read command in the interface queue 136 and enqueue the subsequent read command in the command queue 146, when a program operation is not being performed for the physical address mapped to the logical address corresponding to the subsequent read command. While enqueuing the read command into the command queue 146 is being delayed, a read operation is performed in response to the subsequent read command. Therefore, the overall performance of a read operation may be improved.

In this disclosure, a program/read operation for a logical/physical address or a program/read operation of the logical/physical address means programming data into, and/or reading data from, a storage region of the logical/physical address in the memory device 150.

Figure 4A:
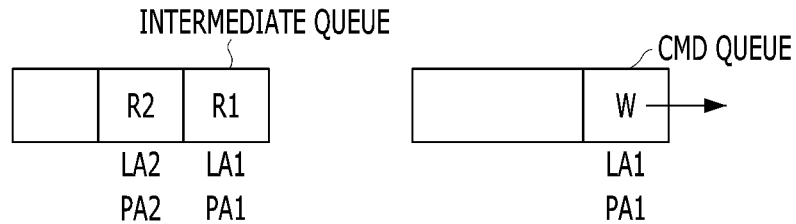
FIG. 4A is a diagram illustrating a method of operating an interface queue and a command queue according to prior art.
Figure 4A:
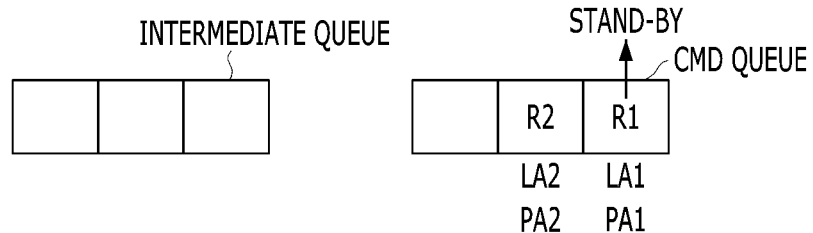

FIG. 4A is a diagram illustrating a method of operating an interface queue and a command queue according to prior art.

It is assumed herein that the interface queue queues a first read command R1 and a second read command R2, and a write command W queued in the command queue is provided to the memory device and thus a program operation is being performed. Also, it is assumed that the logical address of the first read command R1 is mapped to a physical address of the write command W.

The controller 130 provides the memory device with the write command W queued in the command queue to control the memory device 150 to perform a program operation corresponding to the write command W. The logical address and the physical address of the write command W are a first logical address LA1 and a first physical address PA1, respectively, and the controller 130 updates the P2L information by mapping the first physical address PA1 to the first logical address LA1.

The controller locates read data of the first read command R1 based on the P2L information. Since the logical address corresponding to the first read command R1 is the first logical address LA1, which is the same as the logical address corresponding to the write command W, the controller 130 maps the first logical address LA1 to the first physical address PA1. The second read command R2 has a second logical address LA2 mapped to a second physical address PA2.

The controller 130 enqueues the first and second read commands R1 and R2 in the command queue by sequentially dequeuing the first and second read commands R1 and R2 from the interface queue while a program operation is performed for the write command W. The controller 130 keeps the first read command R1 queued in the command queue. A logical address of the first read command R1 is mapped to a physical address of the write command W for which a program operation is being performed. Since the command queue is operated based on the FIFO scheme, the second read command R2 that is queued in the command queue behind the first read command R1 also stays queued in the command queue even though the second read command R2 has a logical address different from the logical address at which a program operation is being performed. Therefore, a read operation for the second read command R2 is performed only after a read operation for the first read command R1 is performed.

Figure 4B:
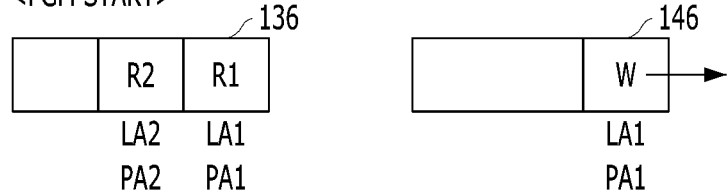
FIG. 4B is a diagram illustrating a method of operating an interface queue and a command queue in accordance with an embodiment of the present invention.
Figure 4B:
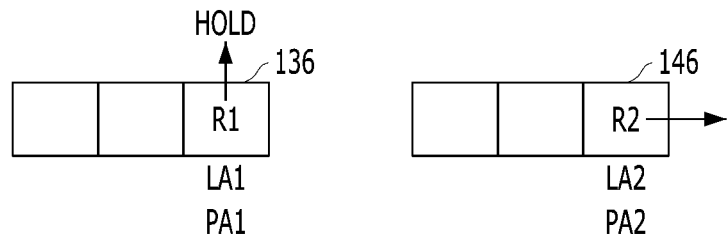

FIG. 4B is a diagram illustrating a method of operating the interface queue and the command queue in accordance with an embodiment of the present invention.

Just as illustrated in FIG. 4A, the logical address and the physical address of the write command W queued in the command queue 146 may be the same as the logical address and the physical address of the first read command R1 queued in the interface queue 136, respectively, and the logical address of the second read command R2 queued in the interface queue 136 may be different from the logical address and the physical address of the write command W.

The controller 130 may write the logical address for the write command W into the memory 144 after providing the memory device 150 with the write command W. The memory 144 may store a list of logical addresses for which program operations are being performed. The controller 130 may determine when to dequeue the first and second read commands R1 and R2 from the interface queue 136 based on whether or not the logical addresses of the first and second read commands R1 and R2 are included in the list. Since the logical address LA1 of the first read command R1 queued in the interface queue 136 is the same as the logical address LA1 of the write command W written in the list, the controller 130 may delay enqueuing the read command R1 in the command queue 146. Since the logical address LA2 of the second read command R2 is not included in the list, the controller 130 may dequeue the second read command R2 from the interface queue 136 and enqueue it in the command queue 146 while the first read command R1 stays queued in the interface queue 136. According to this embodiment of the present invention, the controller 130 may prevent occurrence of a problem in that the dequeue moment of the second read command is delayed as the dequeue moment of the first read command which is enqueued first in the command queue, which is operated based on the FIFO scheme, is delayed by dynamically changing the dequeue order of the read commands queued in the interface queue 136.

Figure 5A:
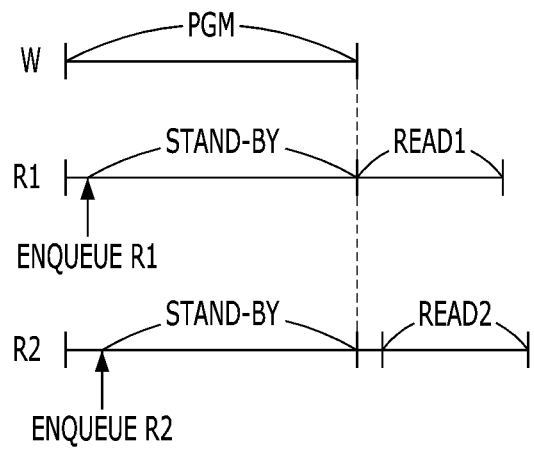
FIG. 5A is a timing diagram of a program operation and a read operation according to prior art.

FIG. 5A is a timing diagram of a program operation and a read operation according to prior art.

The timing diagram shown in FIG. 5A shows the operations for the write command and the first and second read commands R1 and R2 illustrated in FIG. 4A in that order.

The controller 130 controls the memory device 150 to perform a program operation based on the write command W. During the program operation, the controller 130 dequeues the first read command R1 from the interface queue and enqueues the first read command R1 into the command queue based on the FIFO scheme. Since the logical address of the first read command R1 is the same as the logical address of the write command W for which the program operation is being performed, the controller 130 delays dequeuing the first read command R1 from the command queue until the program operation is completed. The controller 130 enqueues the second read command R2 into the command queue after enqueuing the first read command R1 into the command queue. The controller 130 does not dequeue the second read command R2 from the command queue until the controller 130 dequeues the first read command R1 from the command queue based on the FIFO scheme. The controller 130 controls the memory device 150 to perform a first read operation READ1 by dequeuing the first read command R1 from the command queue when the program operation is completed. The controller 130 controls the memory device 150 to perform a second read operation READ2 by dequeuing the second read command R2 from the command queue after dequeuing the first read command R1 based on the FIFO scheme.

Figure 5B:
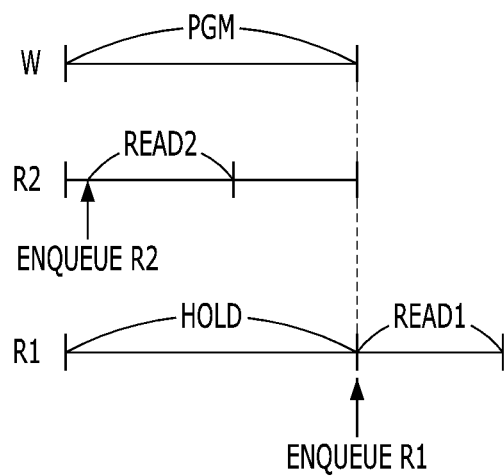
FIG. 5B is a timing diagram of a program operation and a read operation in accordance with an embodiment of the present invention.

FIG. 5B is a timing diagram of a program operation and a read operation in accordance with an embodiment of the present invention.

The timing diagram shown in FIG. 5B shows the operations for the write command and the first and second read commands R1 and R2 shown in FIG. 4B in that order.

The controller 130 may delay dequeuing the first read command R1 from the interface queue 136, when the logical address of the write command W for which a program operation is being performed is the same as the logical address of the first read command R1 queued in the interface queue 136. The controller 130 may dequeue the second read command R2 having a different logical address than that of the program command W from the interface queue 136, prior to the first read command R1, which was enqueued first in the interface queue 136. The controller 130 may enqueue the second read command R2 in the command queue 146 and control the memory device 150 to perform a read operation READ2 based on the second read command R2 during the execution of the program operation. When the program operation is completed, the controller 130 may enqueue the first read command R1 in the command queue 146 and control the memory device 150 to perform a read operation READ1 based on the first read command R1.

According to this embodiment of the present invention, the controller 130 may control the memory device 150 to perform a read operation for a read command having a logical address which is different from the logical address of the write command while the program operation is performed by changing the dequeue order of the read commands that are enqueued in the interface queue 136 according to whether or not the logical address of the write command for which a program operation is being performed and the logical address of the read command enqueued in the interface queue 136 are the same.

Figure 6:
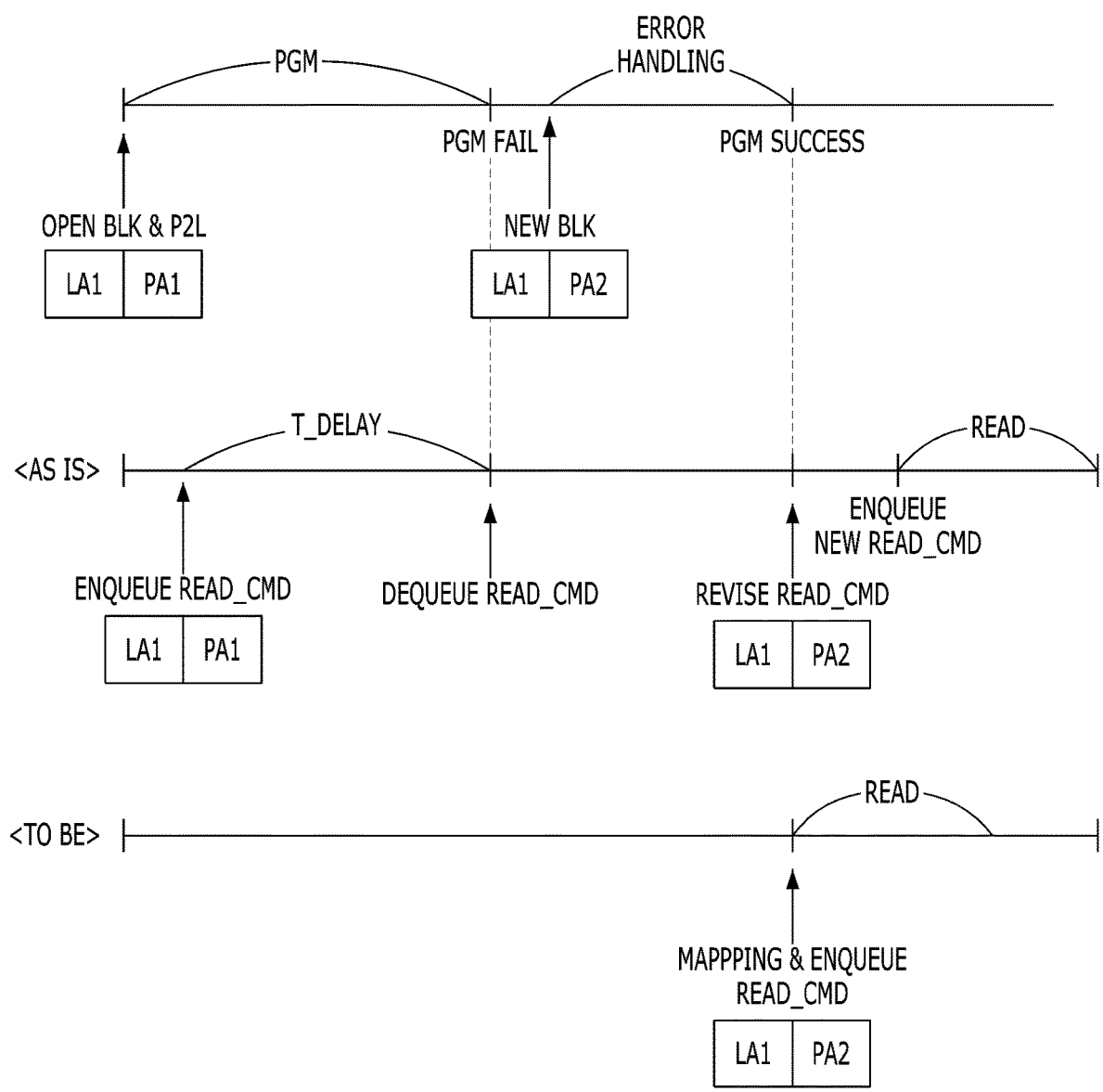
FIG. 6 illustrates the complexity of an error handling operation when a program failure occurs.

FIG. 6 illustrates the complexity of an error handling operation when a program failure occurs.

FIG. 6 illustrates an example where a program operation for a write command corresponding to a first logical address LA1 and a first physical address PA1 fails, and then the program operation is completed after performing an error handling operation of performing the program operation again on a new block NEW BLK represented by a second physical address PA2.

According to prior art, the controller 130 enqueues the read command READ_CMD corresponding to the same logical address LA1 as the write command in the command queue while a program operation for the write command is being performed. The controller 130 does not perform a read operation for the read command READ_CMD until the program operation is completed. When the program operation fails, the controller dequeues the read command READ_CMD from the command queue and keeps it waiting until the error handling operation is completed. The controller controls the memory device to perform the error handling operation of performing the program operation again, this time for the second physical address PA2. When the error handling operation is successfully performed, the controller 130 updates the read command READ_CMD to map the logical address corresponding to the read command READ_CMD to the second physical address PA2 for which the error handling operation is successfully performed, and then enqueues the updated read command NEW READ_CMD back into the command queue.

According to prior art, when a program operation corresponding to the same logical address as the read command READ_CMD enqueued in the command queue is failed, the controller 130 has to dequeue the read command READ_CMD from the command queue, update the read command READ_CMD to have a physical address (e.g., the second physical address PA2) newly allocated to the program-failed data through the error handling operation, and re-enqueue the updated read command READ_CMD into the command queue. Therefore, there is a problem in that the complexity that occurs during the error handling process increases.

According to an embodiment of the present invention, the controller 130 may delay an operation of enqueuing the read command READ_CMD corresponding to the same logical address as the write command for which a program operation is being performed in the command queue 146. The controller 130 may enqueue the read command READ_CMD in the command queue 146 by mapping the logical address of the read command READ_CMD to the physical address at which the program operation is successfully performed only after the program operation is successfully performed. Therefore, since the integrity of the physical address of the read command READ_CMD queued in the command queue 146 is secured, the complexity of the error handling operation may be reduced, as compared with the prior art.

Figure 7:
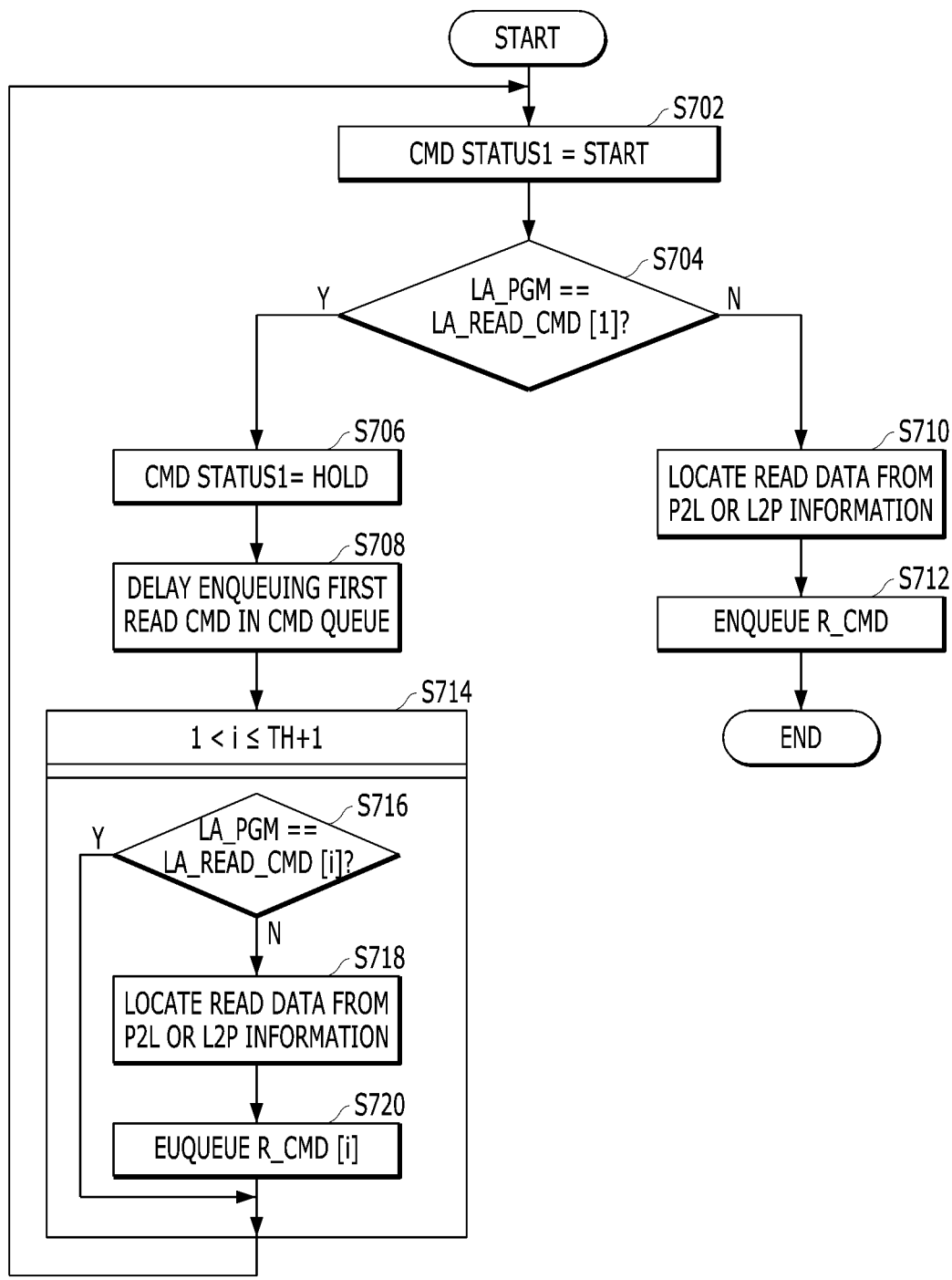
FIG. 7 is a flowchart describing an operation of a memory system in accordance with an embodiment of the present invention.

FIG. 7 is a flowchart describing an operation of the memory system 110 in accordance with an embodiment of the present invention.

In step S702, the controller 130 may record a status CMD STATUS1 of the first read command as a start status START at the time that a first read command is to be dequeued from the interface queue 136. The controller 130 may determine when to dequeue the read command from the interface queue 136 based on the first-in-first-out scheme.

In step S704, the controller 130 may determine whether the logical address LA_PGM for which a program operation is being performed and which is stored in the memory 144 is the same as the logical address LA_READ_CMD [1] of the first read command. To be specific, the controller 130 may store a list of logical addresses LA_PGM for which a program operation that is being performed in the memory 144, and may determine whether any of the logical addresses LA_PGM included in the list is the same as the logical address LA_READ_CMD [1] of the first read command.

In step S706, when the logical address LA_PGM at which a program operation is being performed and which is stored in the memory 144 is the same as the logical address LA_READ_CMD [1] of the first read command ('Y' in the step S704), the controller 130 may record a status CMD STATUS1 of the first read command as a hold status HOLD. According to an embodiment of the present invention, the controller 130 may set a flag FLAG to determine the status of the first read command.

In step S708, when the status of the first read command is HOLD, the controller 130 may delay enqueuing the first read command in the command queue 146.

In step S714, the controller 130 may determine whether or not to dequeue one or more subsequent read commands. The controller 130 may determine whether or not to dequeue up to a threshold number TH of the subsequent read commands after recording the status of the first read command as HOLD. The threshold number TH may not be restricted to a certain value. Rather the threshold number TH may be predetermined value, which is determined by performing a simulation or a test. The result of the simulation or the test may depend on a performance, a power and specifications of the memory system 110. The controller 130 may return back to step S702 and change the status CMD STATUS1 of the first read command to the start status START. The controller 130 may then determine whether or not to dequeue the first read commands in step S704.

In step S716, the controller 130 may determine whether the logical address LA_PGM for which the program operation is being performed is the same as a logical address LA_READ_CMD [i] of a '$i^{th}$' read command.

In step S718, when the logical address LA_PGM for which the program operation is being performed is not the same as the logical address LA_READ_CMD [i] of the '$i^{th}$' read command ('N' in the step S716), the controller 130 may locate read data based on the P2L information or L2P information by mapping the logical address LA_READ_CMD [i] of the '$i^{th}$' read command to a physical address retrieved from the P2L information or L2P information.

In step S720, the controller 130 may enqueue the '$i^{th}$' read command in command queue 146 prior to the first read command, which is enqueued in the interface queue 136 prior to the '$i^{th}$' read command. The controller 130 may provide the memory device 150 with the '$i^{th}$' read command while the first read command stays in the interface queue 136 so that a read operation in response to the '$i^{th}$' read command is performed prior to a read operation for the first read command.

For example, when the threshold value TH is '2', the controller 130 may write the status CMD STATUS1 of the first read command as the hold status HOLD, and keep the first read command queued in the interface queue 136. Subsequently, the controller 130 may perform the operations of the steps S716 to S720 for second and third read commands R_CMD [2], R_CMD [3], which are read commands enqueued in the interface queue 136 behind the first read command. Subsequently, the controller may return back to a step of changing the status CMD STATUS1 of the first read command to the start status START. The controller 130 may then perform the operations of the steps for determining whether or not to dequeue the first read command again.

In step S710, when the logical address LA_PGM for which the program operation is being performed is not the same as the logical address LA_READ_CMD [1] of the first read command ('N' in the step S704), the controller 130 may locate read data based on the P2L information or L2P information by mapping the logical address LA_READ_CMD [1] of the first read command to a physical address retrieved from the P2L information or L2P information.

In step S712, the controller 130 may enqueue the first read command in the command queue 146. The controller 130 may provide the memory device 150 with the first read command from the command queue 146 and may control the memory device 150 to perform a read operation according to the provided first read command.

Figure 8:
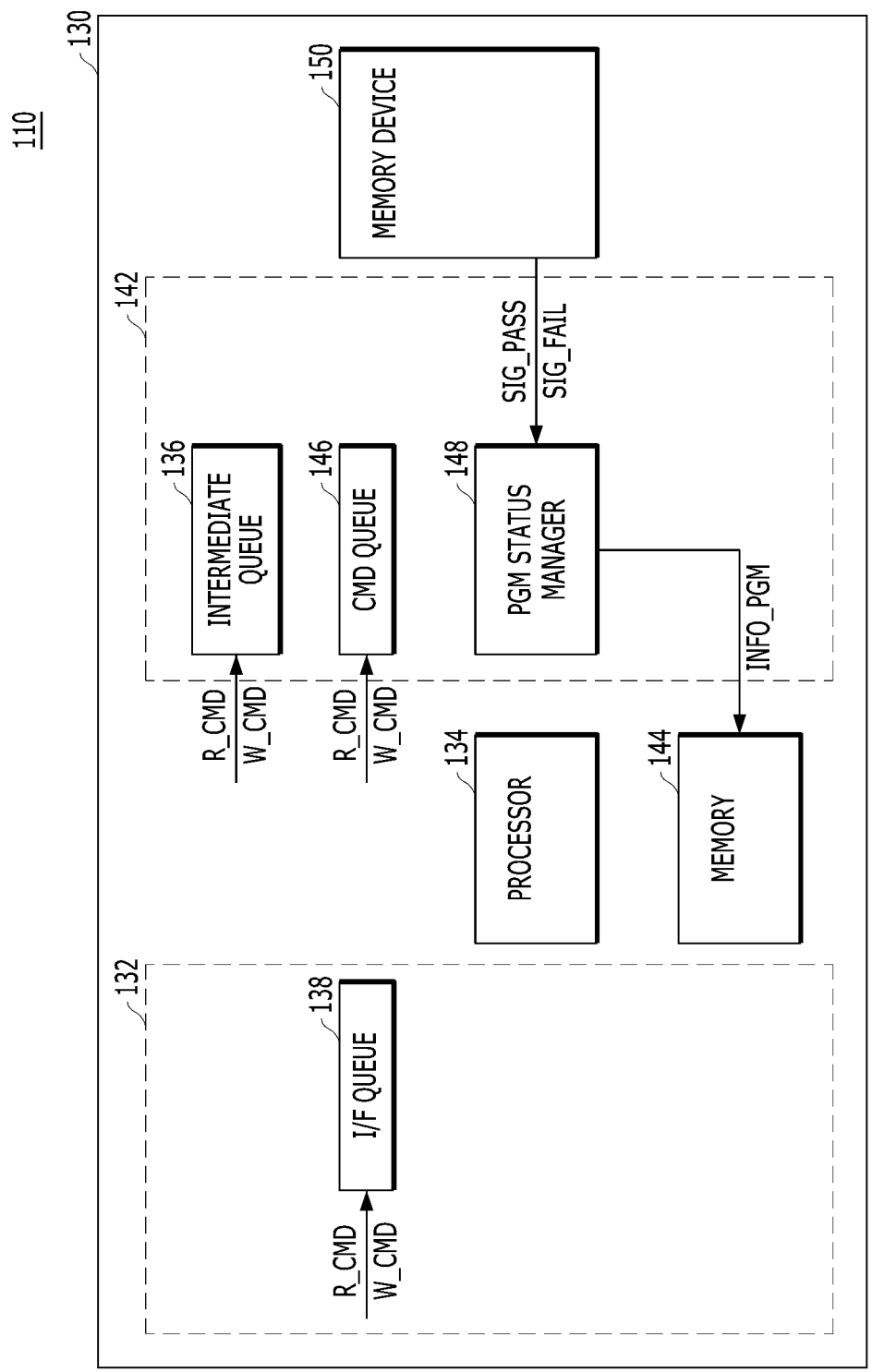
FIG. 8 is a block diagram illustrating a memory system in accordance with an embodiment of the present invention.

FIG. 8 is a block diagram illustrating the memory system 110 in accordance with an embodiment of the present invention.

FIG. 8 shows only elements related to aspects of the present invention described below.

The controller 130 may include a host interface 132, a processor 134, a memory 144, and a memory interface 142. The host interface 132 may include an interface queue 136. The memory interface 142 may include a command queue 146 and a program status manager 148.

The interface queue 136 may enqueue a read command R_CMD and a write command W_CMD provided from the host 102. Basically, the interface queue 136 may be operated based on the FIFO scheme, but as described below, the order in which commands are dequeued may be changed when the logical address of the write command for which a program operation is being performed is the same as the logical address of the read command which is queued in the interface queue 136.

The program status manager 148 may store the logical address INFO_PGM of the write command for which a program operation is being performed in the memory 144. The program status manager 148 may store a list of logical addresses of write commands for which a program operation is being performed in the memory 144, and delete the logical addresses of write commands for which a program operation is completed from the list. For example, the program status manager 148 may delete the logical address of the write command from the list in response to a pass signal SIG_PASS which is provided from the memory device 150. When a failure signal SIG_FAIL is provided from the memory device 150, the program status manager 148 may maintain the logical address of the write command in the list.

The processor 134 may determine whether or not to dequeue a read command from the interface queue 136. The processor 134 may determine whether or not a logical address of the read command is included in the list stored in the memory 144 at the time the read command is to be dequeued from the interface queue 136. The processor 134 may delay enqueuing the read command in the command queue 146 when the logical address of the read command is the same as the logical address of the write command for which the program operation is being performed. The processor 134 may then determine whether or not to dequeue subsequent read command(s) from the interface queue 136, based on a threshold value; the number of subsequent read commands up to the threshold value may be dequeued. After such determination, the processor 134 may determine whether or not to dequeue the delayed read command.

When the logical address of the read command is not included in the list, the processor 134 may map that logical to a physical address, and then dequeue the read command from the interface queue 136 and enqueue the read command in the command queue 146.

According to an embodiment of the present invention, when the logical address of the write command for which a program operation is being performed is the same as the logical address of the read command queued in the interface queue 136, the processor 134 may delay the operation of enqueuing the read command in the command queue 146 and change the queuing order so that the read operation is performed first for the subsequent read command. Such operations may advantageously improve performance of the read operation. Also, the processor 134 may map the logical address of the read command to the physical address at which a program operation is successfully performed after the program operation is successfully performed and then enqueue the read command to the command queue 146. Such operations may advantageously decrease the complexity of an associated error handling operation.

According to embodiments of the present invention, a memory system may delay an operation of enqueuing a read command having the same logical address as a logical address at which a program operation is being performed in a command queue so as to improve the performance of a read operation and reduce the complexity of an error handling operation.

While the present invention has been illustrated and described with respect to the specific embodiments, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A memory system, comprising:
a memory device;
a first queue suitable for queuing commands received from a host;
a second queue suitable for enqueuing the commands from the first queue and dequeuing the commands to the memory device according to the FIFO scheme; and
a processor suitable for:
delaying an operation of enqueuing a read command into the second queue until the program operation is successfully performed when a logical address of a write command, in response to which a program operation is being performed, is the same as a logical address corresponding to the read command enqueued in the first queue; and
determining whether or not to enqueue a subsequent read command, which is enqueued in the first queue after the read command, into the second queue.

2. The memory system of claim 1, further comprising: a memory suitable for storing a list of a logical address of the write command for which the program operation is being performed.

3. The memory system of claim 2, further comprising: a program status manager suitable for providing the processor with a comparison result of comparing the logical address of the read command enqueued in the first queue with the logical address in the list.

4. The memory system of claim 3, wherein the processor enqueues the subsequent read command into the second queue when the logical address of the subsequent read command is not the same as the logical address in the list.

5. The memory system of claim 4, wherein the processor controls the memory device to perform a read operation according to the subsequent read command while the program operation is being performed.

6. The memory system of claim 1, wherein the processor determines whether to enqueue the read command into the second queue or not, when the enqueuing of the read command into the second queue is delayed and then whether to enqueue subsequent read commands into the second queue or not is determined.

7. The memory system of claim 6, wherein the processor records a status of the read command as a hold status, when the logical address of the read command and the logical address of the write command are the same.

8. The memory system of claim 7, wherein the processor changes the status of the read command to a start status when it is determined whether to enqueue the subsequent read commands into the second queue.

9. The memory system of claim 1, wherein when the program operation is failed, the processor controls the memory device to perform an error handling operation of performing the program operation onto a new normal memory block.

10. The memory system of claim 9, wherein when the error handling operation is successfully performed, the processor maps the logical address of the read command to a physical address of the new normal memory block.

11. A method for operating a memory system, comprising:
queuing commands received from a host into a first queue;
enqueuing the commands from the first queue into a second queue and dequeuing the commands to a memory device according to the FIFO scheme;
when a logical address corresponding to a write command, in response to which a program operation is being performed, is the same as a logical address of a read command enqueued in the first queue, delaying an operation of enqueuing the read command into the second queue until the program operation is successfully performed; and
determining whether or not to enqueue a subsequent read command which is enqueued in the first queue behind the read command into the second queue, when the enqueuing of the read command into the second queue is delayed.

12. The method of claim 11, further comprising: storing a list of a logical address of the write command for which the program operation is being performed.

13. The method of claim 12, further comprising: outputting a comparison result of comparing the logical address of the read command enqueued in the first queue with the logical address in the list.

14. The method of claim 13, wherein the determining of whether or not to enqueue the subsequent read command into the second queue includes enqueuing the subsequent read command into the second queue when the logical address of the subsequent read command is not the same as the logical address in the list.

15. The method of claim 14, further comprising: performing a read operation according to the subsequent read command while the program operation is being performed, when the subsequent read command is enqueued in the second queue.

16. The method of claim 11, further comprising: determining whether or not to enqueue the read command into the second queue, when the enqueuing of the read command into the second queue is delayed and then determining whether or not to enqueue subsequent read commands into the second queue.

17. The method of claim 16, wherein the delaying of the operation of enqueuing the read command into the second queue until the program operation is successfully performed includes recording a status of the read command as a hold status, when the logical address of the read command and the logical address of the write command are the same.

18. The method of claim 17, further comprising: changing the status of the read command to a start status when it is determined whether to enqueue the subsequent read commands into the second queue.

19. The method of claim 11, further comprising: when the program operation fails, performing an error handling operation of performing the program operation on a new normal memory block.

20. The method of claim 19, further comprising: when the error handling operation is successfully performed, mapping the logical address of the read command to a physical address of the new normal memory block.

* * * * *